(12) United States Patent
Sullivan et al.

(10) Patent No.: US 10,242,372 B2
(45) Date of Patent: Mar. 26, 2019

(54) PROVIDING TRACKING AND MARKETING ANALYTICS

(71) Applicant: Precise Innovation, LLC, Leawood, KS (US)

(72) Inventors: Brian Sullivan, Village of Loch Lloyd, MO (US); Jason B. Hicks, Leawood, KS (US); Eric W. Long, Leawood, KS (US)

(73) Assignee: Precise Innovation, LLC, Leawood, KS (US)

( * ) Notice: Subject to any disclaimer, the term of this patent is extended or adjusted under 35 U.S.C. 154(b) by 877 days.

(21) Appl. No.: 14/094,088

(22) Filed: Dec. 2, 2013

(65) Prior Publication Data

US 2015/0154614 A1    Jun. 4, 2015

(51) Int. Cl.
G06Q 30/02    (2012.01)
G08B 21/02    (2006.01)
H04W 4/021   (2018.01)
G06Q 10/02   (2012.01)

(52) U.S. Cl.
CPC ..... *G06Q 30/0201* (2013.01); *G06Q 30/0205* (2013.01); *G06Q 30/0224* (2013.01); *G06Q 30/0261* (2013.01); *G08B 21/0227* (2013.01); *G08B 21/0236* (2013.01); *G08B 21/0266* (2013.01); *G08B 21/0294* (2013.01); *G06Q 10/02* (2013.01); *H04W 4/021* (2013.01)

(58) Field of Classification Search
CPC .......... G06Q 30/0261; G06Q 30/0205; G06Q 30/0201; H04W 4/021; G08B 21/0227; G08B 21/0236; G08B 21/0263; G08B 21/0266; G08B 21/0294

USPC ...... 705/7.34, 7.29, 14.58, 7.25; 340/539.13, 340/573.1

See application file for complete search history.

(56) References Cited

U.S. PATENT DOCUMENTS 8,669,845 B1 *   3/2014   Chakraborty .......... G06Q 50/00
                                                         235/440
2005/0075116 A1 *  4/2005  Laird ....................... A61B 5/04
                                                         455/456.3

(Continued)

OTHER PUBLICATIONS

Sam Diaz, New Technology Helps Keep Close Track of Children, Knight Ridder Tribune News Service (Jul. 2010) (Year: 2010).*

*Primary Examiner* — Charles Guiliano
(74) *Attorney, Agent, or Firm* — Shook, Hardy & Bacon L.L.P.

(57) ABSTRACT

Systems, methods, computer storage media, and user interfaces are provided for vacation tracking and providing marketing analytics. Check-in information for a group of people is received. A tracking device is associated with each of one or more persons associated with the group of people. Each tracking device associated with the one or more persons is activated. One or more boundaries are received from the user or location. The one or more boundaries may define safe areas associated with the location. Tracking information associated with locations of each of the one or more persons is provided. Alerts initiated by the tracking device may be provided to the user. Incentives are provided to the user and may be based on tracking information received by the location to encourage the user or the one or more persons to move to another area within the location.

20 Claims, 13 Drawing Sheets

(56) References Cited

U.S. PATENT DOCUMENTS

| | | | | |
|---|---|---|---|---|
| 2012/0064921 A1* | 3/2012 | Hernoud | ............... | G01C 21/20 |
| | | | | 455/456.6 |
| 2013/0346170 A1* | 12/2013 | Epstein | ................. | G06Q 30/02 |
| | | | | 705/14.14 |
| 2014/0210616 A1* | 7/2014 | Ramachandran | .. | G08B 21/0227 |
| | | | | 340/539.13 |

* cited by examiner

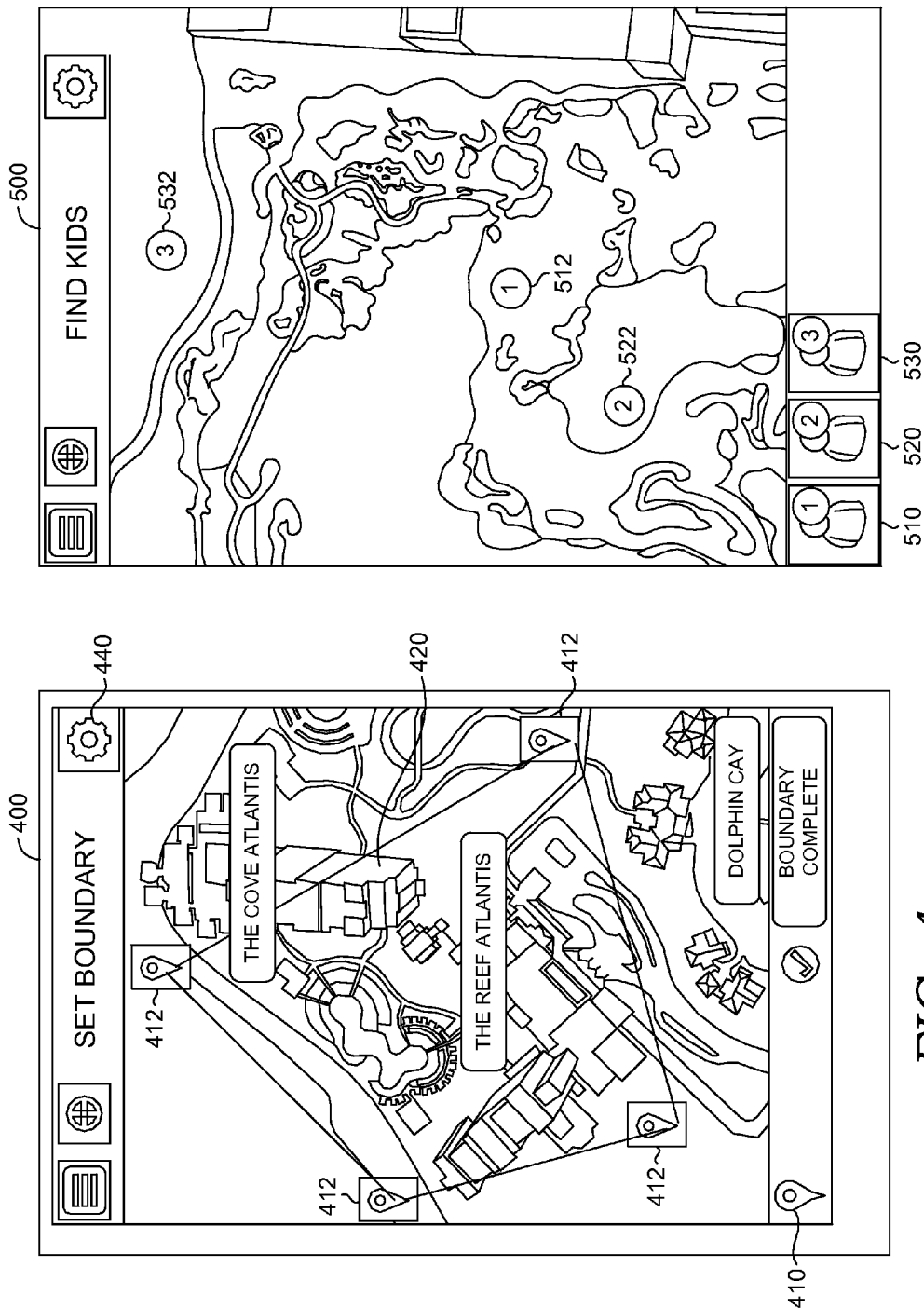

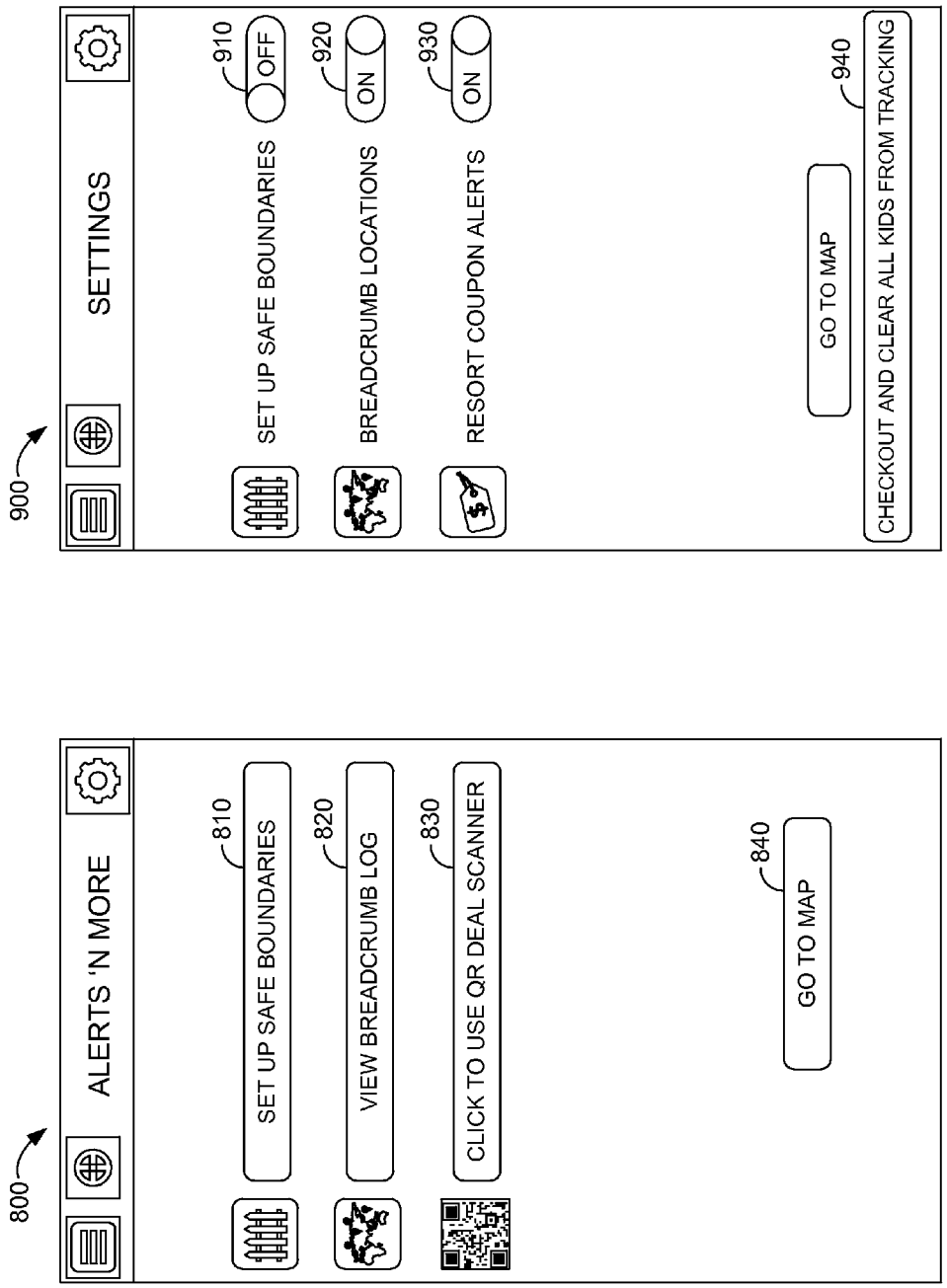

PROVIDING TRACKING AND MARKETING ANALYTICS

BACKGROUND

Tracking devices are sometimes used to help parents determine an approximate location of their children. Global Positioning System (GPS) is typically used by these tracking devices to provide the location to a web interface or a smartphone application so parents can monitor the location of children. However, these GPS tracking devices are limited in functionality and fail to collect and communicate data that can be utilized for many other purposes, such as marketing analytics, marketing, custom branding, customer loyalty, cashless payments, and the like.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, computer storage media, and user interfaces are provided for tracking and providing marketing analytics. Check-in information for a group of people is received. The check-in information may be associated with a resort, camp, school, group, facility, theme park, stadium, tourist attraction, or shopping mall. A tracking device is associated with each of one or more persons associated with the group of people. Each tracking device is associated with the one or more persons. Login credentials are received from a user via an application on a user device. One or more boundaries are received from the user or the location. The one or more boundaries may define safe areas associated with the location for each of the one or more persons. Tracking information associated with tracking locations of each of the one or more persons is received. Alerts are provided to the user. The tracking device may enable initiation of the alerts by each of the one or more persons. Incentives are provided to the user and may be based on tracking information received by the location to encourage the user or the one or more persons to move to other areas within the location.

BRIEF DESCRIPTION OF THE DRAWINGS

Embodiments are described in detail below with reference to the attached drawing figures, wherein:

FIGS. 3-12 depict illustrative screen displays, in accordance with embodiments of the present invention;

DETAILED DESCRIPTION

Figure 1:
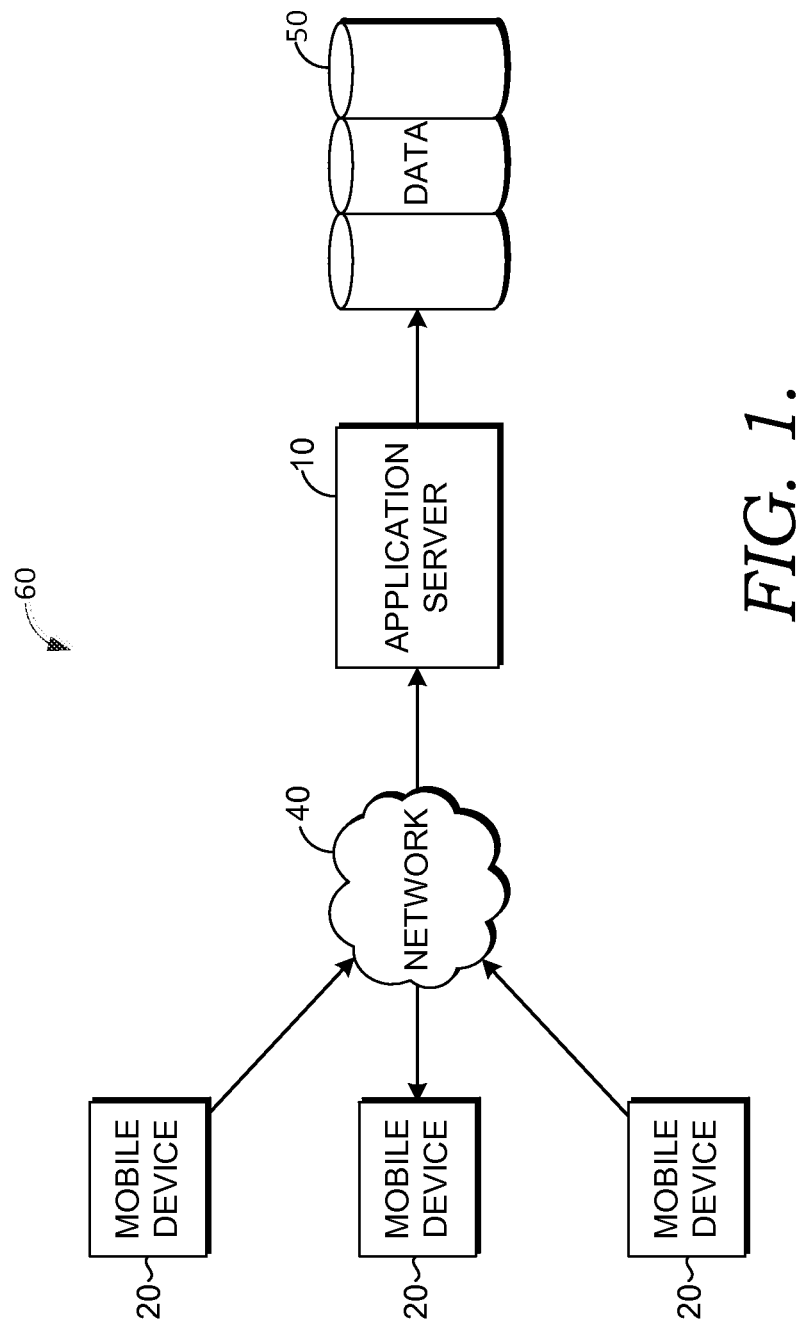
FIG. 1 is a block diagram of an exemplary computing environment suitable for use in implementing embodiments of the present invention FIG. 2 schematically shows an exemplary computing system environment for performing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Parents often plan vacations based on locations that provide a family-friendly environment. These locations may provide perks that attract families. However, these perks are often static in nature and do not help drive traffic and increase sales once the families are actually on location. Existing tracking systems do not provide traffic and location data that can provide a deep understanding of where parents and children spend time and money. Further existing tracking systems are limited to their core function, tracking, and do not provide marketing opportunities to help drive traffic and increase sales to both families on location and those that may return.

Various aspects of the technology described herein are generally directed to systems, methods, and computer-readable storage media for providing tracking and marketing analytics. Check-in information for a group of people is received. The check-in information may be associated with a resort, camp, school, group, facility, theme park, stadium, tourist attraction, or shopping mall. A tracking device is associated for each of one or more persons associated with the group of people. Each tracking device associated with the one or more persons is activated. Login credentials are received from a user via an application on a user device. One or more boundaries are received from the user or a location. The one or more boundaries may define safe areas associated with the location for each of the one or more persons. Tracking information associated with tracking locations of each of the one or more persons is received. In embodiments, alerts are provided to the user indicating a location of a tracking device associated with a person being tracked. The tracking device may enable initiation of the alerts by each of the one or more persons. In embodiments, incentives are provided to the user. The incentives may be based on tracking information received by the location. The incentives may encourage the user or the one or more persons to move to other areas of the location or revisit the location. In embodiments, marketing analytics are provided to the location. The marketing analytics may include location and traffic data for each tracking device and each user device.

Accordingly, one embodiment of the present invention is directed to one or more computer storage media storing computer-useable instructions that, when used by one or more computing devices, cause the one or more computing devices to perform a method of providing tracking and marketing analytics. The method includes: receiving check-in information for a group of people; associating a tracking device for each of one or more persons associated with the group of people; activating each tracking device associated with the one or more persons; receiving login credentials from a user via an application; and providing tracking information associated with tracking locations of each of the one or more persons.

Another embodiment of the present invention is directed to computer storage media having computer-executable instructions embodied thereon that, when executed by one or more computing devices, cause the one or more computing devices to produce a graphical user interface (GUI) for providing tracking and marketing analytics. The GUI includes: an addition display area that displays an image, a name, and an identifier associated with one or more persons, the identifier corresponding to a tracking device; a boundary display area that displays a map associated with a location, the map enabling a user or the location to set one or more boundaries defining safe areas associated with the location for each of the one or more persons; a tracking display area that displays a tracking location within the location of each of the one or more persons; an alert display area that displays alerts from the one or more persons, the alerts initiated by the tracking device; and an incentives display area that displays incentives based on information received by the location.

Yet another embodiment of the present invention includes a system for providing vacation tracking and marketing analytics. The system includes one or more processors coupled to a computer storage medium, the computer storage medium having stored thereon a plurality of computer software components executable by the processor. The computer software components include: a check-in component that receives check-in information for a group of people and associates a tracking device for each of one or more persons associated with the group; an add component that receives an indication a user has added each of the one or more persons to an application associated with a location launched on a user device associated with the user; a boundary component that receives one or more boundaries from the user, the one or more boundaries defining safe areas associated with the location for each of the one or more persons; a track component that receives tracking information from the tracking device for each of the one or more persons, the tracking information identifying tracking locations of each of the one or more persons relative to the location; an alert component that provides alerts to the user, the tracking device enabling initiation of an alert; and a deal/marketing component that provides incentives to the user, the incentives based on tracking information received by the location and including encouragement to the user or the one or more persons to move to another area within the location.

Having briefly described embodiments of the present invention, an exemplary operating environment suitable for use in implementing embodiments of the present invention is described below. Referring to FIG. 1 an exemplary computing environment with which embodiments of the present invention may be implemented is illustrated and designated generally as reference numeral 60. The computing environment 60 is merely an example of one suitable computing environment and is not intended to suggest any limitation as to the scope of use or functionality of the invention. Neither should the computing environment 60 be interpreted as having any dependency or requirement relating to any single component or combination of components illustrated therein.

The present invention might be operational with numerous other general purpose or special purpose computing system environments or configurations. Examples of well-known computing systems, environments, and/or configurations that might be suitable for use with the present invention include personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention might be described in the general context of computer-executable instructions, such as program modules, being executed by a computer. Exemplary program modules include routines, programs, objects, components, and data structures that perform particular tasks or implement particular abstract data types. The present invention might be practiced in distributed computing environments where tasks are performed by remote processing devices that are linked through a communications network. In a distributed computing environment, program modules might be located in association with local and/or remote computer storage media (e.g., memory storage devices).

With continued reference to FIG. 1, the computing environment 60 includes a general purpose computing device in the form of an application server 10. Exemplary components of the application server 10 include a processing unit, internal system memory, and a suitable system bus for coupling various system components, including database cluster 50, with the application server 10. The system bus might be any of several types of bus structures, including a memory bus or memory controller, a peripheral bus, and a local bus, using any of a variety of bus architectures. Exemplary architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The application server 10 typically includes therein, or has access to, a variety of computer-readable media, for instance, database cluster 50. Computer-readable media can be any available media that might be accessed by application server 10, and includes volatile and nonvolatile media, as well as, removable and nonremovable media. Computer-readable media might include computer storage media. In one embodiment, computer storage media does not include a signal per se. Computer storage media includes volatile and nonvolatile media, as well as, removable and nonremovable media implemented in any method or technology for storage of information, such as computer-readable instructions, data structures, program modules, or other data. In this regard, computer storage media might include RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the application server 10. Combinations of any of the above also may be included within the scope of computer-readable media.

The computer storage media discussed above and illustrated in FIG. 1, including database cluster 50, provide storage of computer-executable instructions, data structures, program modules, and other data for the application server 10. The application server 10 might operate in a computer network 40 using logical connections to one or more mobile devices 20. The mobile devices 20 might be personal computers, servers, routers, network PCs, peer devices, other common network nodes, or the like and might include some or all of the elements described above in relation to the application server 10. The devices can be personal digital assistants or other similar devices.

Exemplary computer networks 40 include local area networks (LANs) and/or wide area networks (WANs). Such networking environments are commonplace in offices, enterprise-wide computer networks, intranets, and the Internet. When utilized in a WAN networking environment, the application server 10 might include a modem or other means for establishing communications over the WAN, such as the Internet. In a networked environment, program modules or portions thereof might be stored in association with the application server 10, the database cluster 50, or any of the mobile devices 20. For example, various application programs may reside on the memory associated with any one or more of the mobile devices 20. It will be appreciated by those of ordinary skill in the art that the network connections shown are exemplary and other means of establishing a communications link between the computers (e.g., application server 10 and mobile devices 20) might be utilized.

In operation, a user might enter commands and information into the one or more mobile devices 20 or convey the commands and information to the application server 10 through input devices, such as a keyboard, a pointing device (commonly referred to as a mouse), a trackball, or a touch pad. In embodiments, such commands and information are communicated to the application server 10 and applications stored in the database cluster 50 are communicated or executed on one or more of the mobile devices 20. Other input devices may include, without limitation, microphones, satellite dishes, scanners, or the like. In addition to a monitor, the application server 10 and/or the one or more mobile devices 20 may include other peripheral output devices, such as speakers and a printer.

Although many other internal components of the application server 10 and the mobile devices 20 are not shown, those of ordinary skill in the art will appreciate that such components and their interconnection are well known. Accordingly, additional details concerning the internal construction of the application server 10 and the mobile devices 20 are not further disclosed herein.

Figure 2:
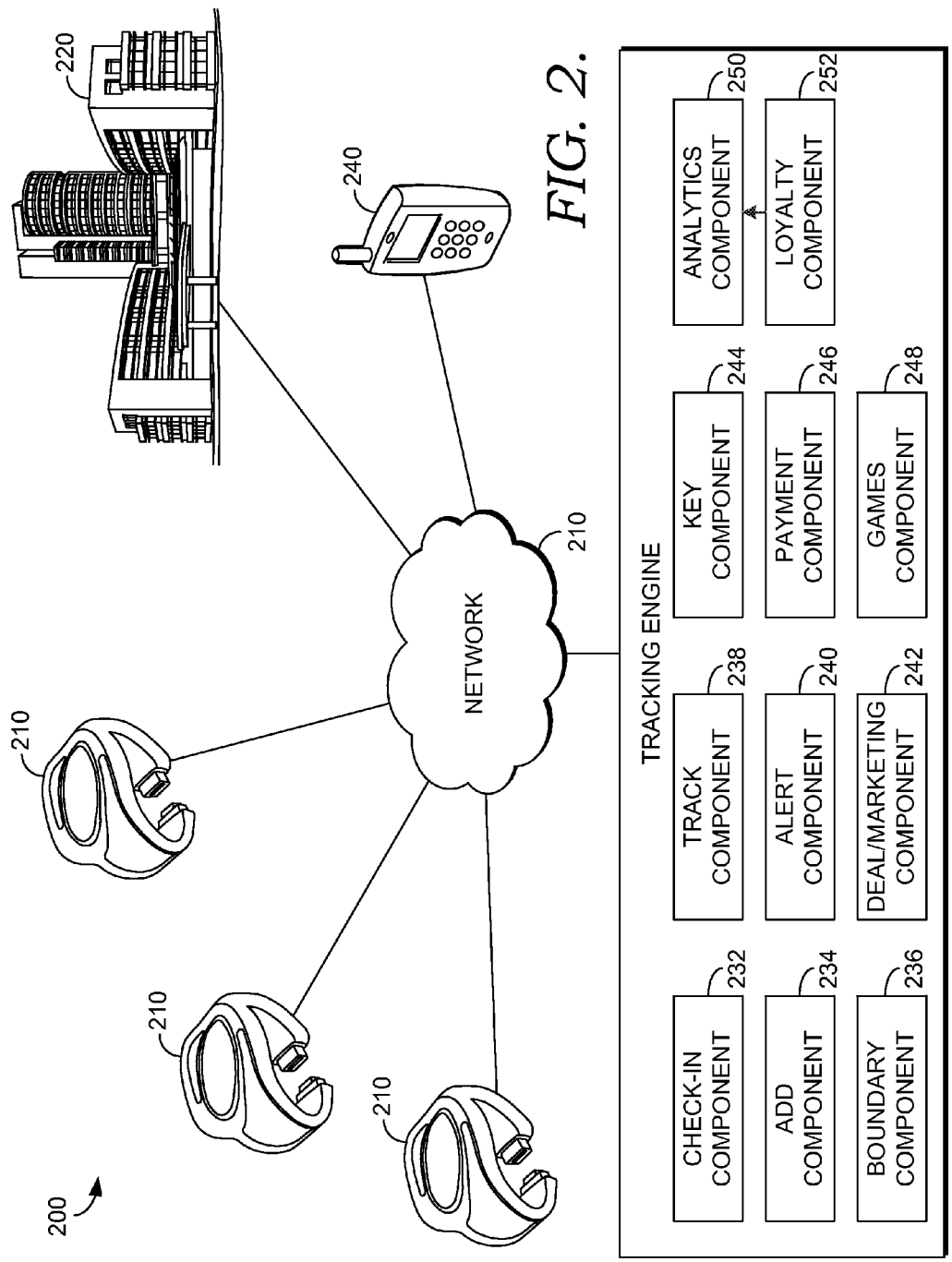

Referring now to FIG. 2, a block diagram is provided illustrating an exemplary system 200 for use in implementing embodiments of the present invention. The system 200 is merely an example of one suitable computing system environment and is not intended to suggest any limitation as to the scope of use or functionality of embodiments of the present invention. Neither should the system 200 be interpreted as having any dependency or requirement related to any single module/component or combination of modules/components illustrated therein.

The system 200 includes one or more tracking devices 210, location 220, tracking engine 230, and a mobile device 240, all in communication with one another via a network 202. The network 202 may include, without limitation, one or more secure local area networks (LANs) or wide area networks (WANs). The network 202 may be a secure network associated with a facility such as a healthcare facility. The secure network 202 may require that a user log in and be authenticated in order to send and/or receive information over the network 202.

In some embodiments, one or more of the illustrated components/modules may be implemented as stand-alone applications. In other embodiments, one or more of the illustrated components/modules may be distributed across multiple tracking engines 230. The components/modules illustrated in FIG. 2 are exemplary in nature and in number and should not be construed as limiting. Any number of components/modules may be employed to achieve the desired functionality within the scope of embodiments hereof. Further, components/modules may be located on any number of servers. By way of example only, the tracking engine 230 might reside on a server, cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

Components of the tracking engine 230 may include a processing unit, internal system memory, and a suitable system bus for coupling various system components, including one or more data stores for storing information (e.g., files and metadata associated therewith). The tracking engine 230 typically includes, or has access to, a variety of computer-readable media.

The computing system environment 200 is merely exemplary. While the tracking engine 230 is illustrated as a single unit, it will be appreciated that the tracking engine 230 is scalable. For example, the tracking engine 230 may in actuality include a plurality of computing devices in communication with one another. The single unit depictions are meant for clarity, not to limit the scope of embodiments in any form.

As shown in FIG. 2, the tracking engine 230 comprises, in various embodiments a check-in component 232, add component 234, boundary component 236, track component 238, alert component 240, deal/marketing component 242, key component 244, payment component 246, games component 248, analytics component 250, and loyalty component 252. In some embodiments, one or more of the components may be implemented as stand-alone applications. It will be understood that the components illustrated in FIG. 2 are exemplary in nature and in number and should not be construed as limiting. Any number of components may be employed to achieve the desired functionality within the scope of embodiments hereof.

Check-in component 232 receives check-in information for a group of people. The check-in information may be associated with a resort, camp, school, group, facility, theme park, stadium, tourist attraction, or shopping mall. The check-in information may be associated with an arrival at a particular location. The check-in information may include a check-out date. Check-in component 232 associates a tracking device for each of one or more persons associated with the group. The tracking devices may be associated with an identifier so the location can track the tracking device. In embodiments, an international mobile equipment identifier (IMEI) or other code allows the location to identify each tracking device. In embodiments, the tracking devices are associated with barcodes and scanned in allowing the check-in component 232 to associate the tracking devices with each person. Check-in component 232 may associate the tracking device with a room associated at a resort that the group of people has checked into. Check-in component 232 may associate the tracking device with a name or group identification associated with the group of people. The tracking device may be an accessory that is worn, carried, or otherwise associated with the person, such as, for example, a band worn around the person's wrist. The tracking device may include GPS, radio-frequency identification (RFID), Bluetooth, Wireless Fidelity (Wi-Fi), or similar location or proximity technology that can be utilized for any of the functionality described herein. Once the check-in component 232 has associated a person with a tracking device, check-in component 232 activates the tracking device for that person.

Add component 234 receives an indication a user has added each of the one or more persons to an application associated with a location launched on a user device associated with the user. The user may add each of the one or more persons via the application. The user may have already added the one or more persons previously via the application. In that instance, add component 234 may receive login credentials from the user via the application and identify the one or more persons associated with that user. A tracking device for each of the one or more persons may be added, activated, and/or deactivated by add component 234 via a web application. The web application may be accessed by the location to add, activate, or deactivate the tracking device at check-in or check-out time. This allows the web application to identify each of the one or more persons associated with each tracking device for the user. Add component 234 may further enable the user to photograph (e.g., utilizing the application), upload a photograph, or utilize an existing photograph for each person and associate the photograph to the corresponding person.

Boundary component 236 receives one or more boundaries from the user or the location. The one or more boundaries may define safe areas associated with the location for each of the one or more persons. For example, the user may be a parent at the location and the one or more persons may be children. The parent may want to give one or more of the children freedom to visit specific areas within the location while prevent one or more of the children from visiting other areas of the location. Boundary component 236 allows the user to specify the boundaries each of the one or more persons may stay within. As can be appreciated, each of the one or more persons may have distinct or unique boundaries. Further, certain locations within the boundaries may be specified as an unsafe area or a particular area. Similarly, the one or more boundaries may define physical boundaries or characteristics of the location. The one or more boundaries may further define age restricted boundaries of the location.

Track component 238 receives tracking information from the tracking device for each of the one or more persons. The tracking information identifies tracking locations of each of the one or more persons relative to the location. The tracking information allows the user to be immediately aware of a location associated with each of the one or more persons. The tracking information may also be logged such that historical information is available to the user. Continuing the example above, the parent may want to know what time a child returned to a room at a resort or a particular area within the location. The historical tracking information that is logged allows the user to confirm or verify historical locations of each of the one or more persons. The historical tracking information further identifies locations on a map the person has visited within a configurable or predetermined period of time.

Alert component 240 provides alerts to the user. The tracking device may enable initiation of an alert. For example, a person may need to alert the user that the user is needed at a particular location (e.g., a child requesting a parent to pick the child up from a location). A panic button on the tracking device may be activated initiating the alert. The alerts may also be initiated when the location of the person is near or crosses a boundary, unsafe area, or a particular area so the user is immediately aware of the situation. The user may want to be immediately alerted when the person travels to the unsafe area or the particular area. For example, a parent may want to be alerted a child travels near a beach, a bar, a club, or any other location specified by the parent, even if that location is within the safe boundaries. Or, the parent may simply want to be alerted when the child returns to the room or particular area associated with the location. In one embodiment, the user is alerted when at least one of the persons is near the user. In one embodiment, the user is alerted when two or more of the persons exceed a predetermined or configurable distance from one another. For example, the user may want to know that one of the persons is near or supervising another of the persons. If the supervising person strays too far from the person that is being supervised, the user may be alerted.

Deal/marketing component 242 provides incentives to the user. The incentives may be based on tracking information received by the location. For example, the incentives may be based on a location of a person. Similarly, the incentives may be based on traffic location associated with more than one person. The incentives may encourage the user or the one or more persons to move to other areas associated with the location. For example, the incentives may include an offer such as a discount or electronic coupon to visit a particular area associated with the location (e.g., a restaurant or activity). The location may provide the offer to reduce traffic at a particular area associated within the location or increase traffic at another area associated with the location. For example, seating may be limited at one restaurant but available at another. In order to maximize sales across the entire location, the location may provide incentives to encourage a group of people to frequent the restaurant with available seating, rather than the restaurant on a waiting list. Deal/marketing component 242 may enable a user to utilize a Quick Response (QR) code reader via the application to access QR incentives provided by the location.

In one embodiment, key component 244 activates the tracking device as a room key associated with a room at a location. The tracking device may utilize RFID and be programmed for each of the one or more persons to use the respective tracking device to access the room. This enables each person to access the room without the risk of losing a room key or having the room key become demagnetized.

In one embodiment, payment component 246 enables the tracking device to be utilized to make cashless payments. The tracking device may utilize RFID allowing each of the one or more persons to use the respective tracking device to initiate transactions at the location. The user may authorize each respective tracking device for specific areas associated with the location, or set limits that can be spent at each area. The user may also preload each tracking device with a particular dollar amount. An alert may be sent to the user when a particular amount has been spent or when a particular amount remains.

In one embodiment, games component 248 provides interactive games in association with the tracking device and areas within the location. The games may utilize GPS, RFID, Bluetooth, Wi-Fi, or similar location or proximity technology to create an interactive game for each person. For example, the games may be geo-tracking based scavenger hunts that reward each person for visiting or finding particular locations within the location. The games may further be interactive games between the tracking devices, such as a hide and seek type game.

In one embodiment, analytics component 250 provides marketing analytics to the location. The marketing analytics may include location and traffic data for each tracking device and each user device. The marketing analytics may be utilized by the location to create detailed reports indicating where groups of people spend time and money on the location. These reports may be utilized to create and design incentives to help drive traffic and increase sales in various areas within the location. The marketing analytics may further identify staffing surpluses and deficiencies at various areas within the location.

Loyalty component 252 provides incentives to the user to revisit the location. The loyalty incentives may interact with an application the user installs on a mobile device to provide offers or incentives to encourage the user to revisit the location or an associated location. The incentives may be provided after a particular time has passes since the user last visited the location. Or the incentives may be provided when the user visits a particular location or website. Similarly, the incentives may be provided when the user initiates a particular search, such as via a search engine or website. The incentives may further be provided when someone associated with the user plans a visit to or books a stay with the location.

Figure 3:
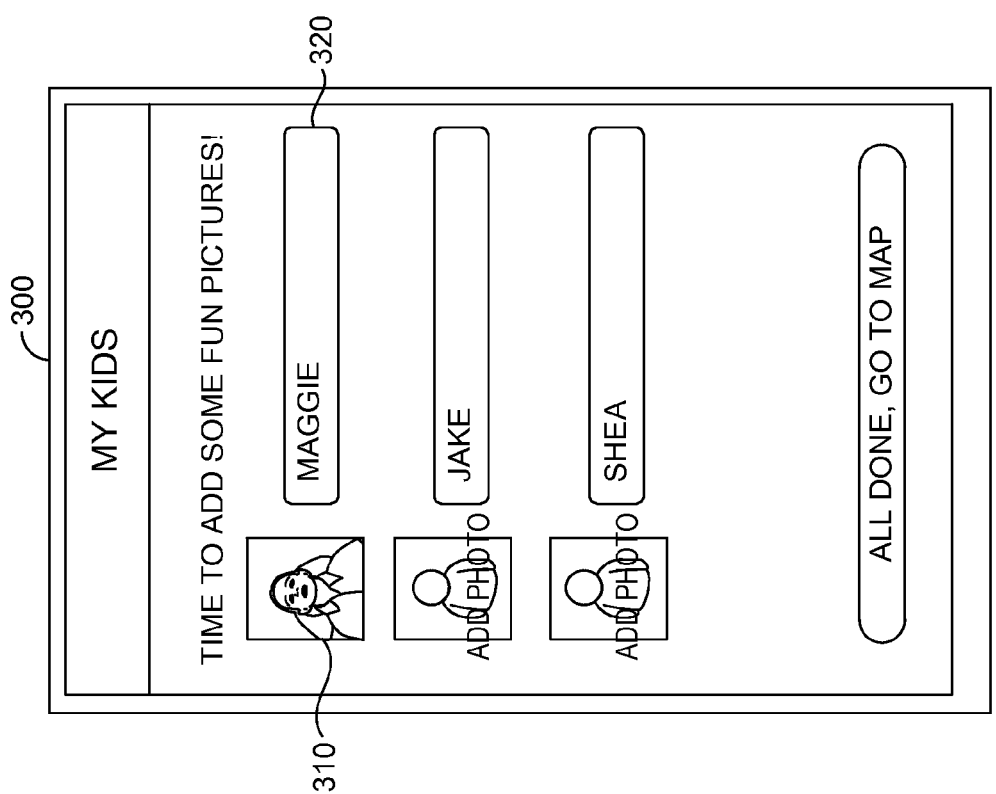

With reference now to FIG. 3, an illustrative graphical user interface is shown for adding one or more persons to a mobile application for tracking the one or more persons, in accordance with embodiments of the present invention. An addition display area 300 displays an image 310, and a name 320 associated with the one or more persons. The identifier 330 corresponds to a tracking device. The user may upload or create an image of each person associated with each tracking device. Similarly, the user may identify a person associated with each tracking device. Each of the image 310 and name 320 may be saved to the application and utilized for the current visit or future visits at the location or other locations. Once the user has added or removed the desired persons to track and associated photographs, the user and location may begin tracking the one or more persons.

Turning now to FIG. 4, an illustrative graphical user interface for selecting one or more boundaries via the mobile application is shown. A boundary display area 400 displays a map associate with a location. The map enables the user to set one or more boundaries 412 defining safe areas 420 associated with the location for each of the one or more persons. A boundary button or icon 410 enables the user to place the one or more boundaries 412 on the map. A settings button or icon 440 may enable the user to configure settings for the mobile application. The settings may include the ability to turn on or off the ability to communicate alerts to the tracking devices, the ability to set up or define boundaries, a tracking log, the ability to receive alerts from the tracking devices, and/or the ability to receive incentives from the location.

In FIG. 5, an illustrative graphical user interface is shown to depict finding the one or more users at the location via the mobile application. In particular, a tracking display area 500 displays a person location 512, 522, 532 within the location for each of the one or more persons, 510, 520, 530. A button or icon representing each of the one or more persons 510, 520, 530 may be selected to zoom in on a person location at the location where that particular person is located. The button or icon representing each of the one or more persons 510, 520, 530 may include the photograph associated with the respective person.

Figure 6:
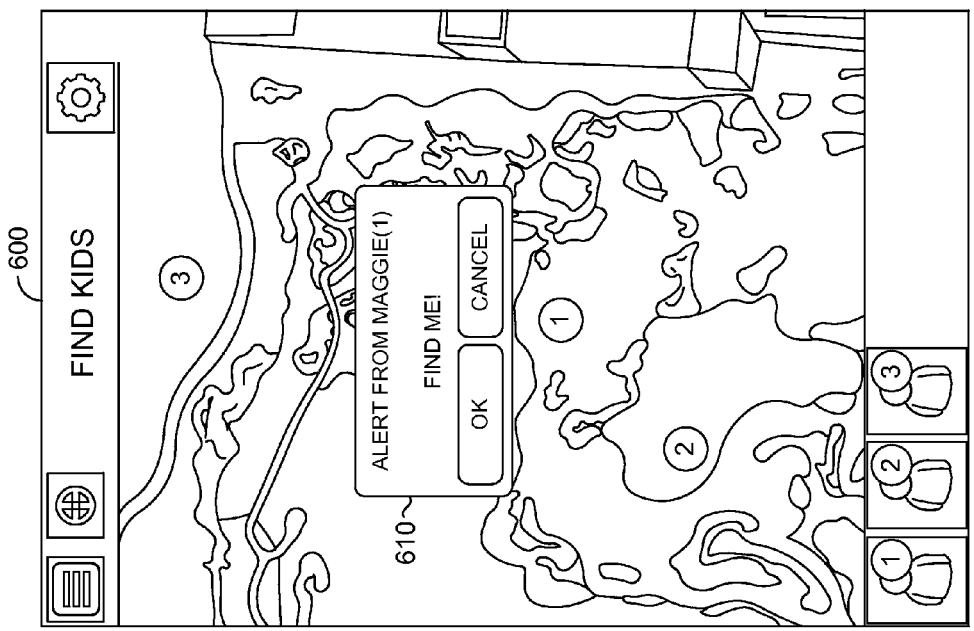

With reference now to FIG. 6, an illustrative graphical user interface is shown for receiving alerts via the mobile application. An alert display area 600 displays alerts 610 from the one or more persons. The alerts 610 may be initiated by the tracking device, such as when a person crosses or approaches a boundary, an unsafe area, or a particular area. The alerts 610 may be initiated by the person via the tracking device, such as by pressing a button on the tracking device. The alerts 610 may be initiated if the person attempts to remove the tracking device. The alerts 610 may enable the user to zoom in on a person location for the person associated with the alert.

Figure 7:
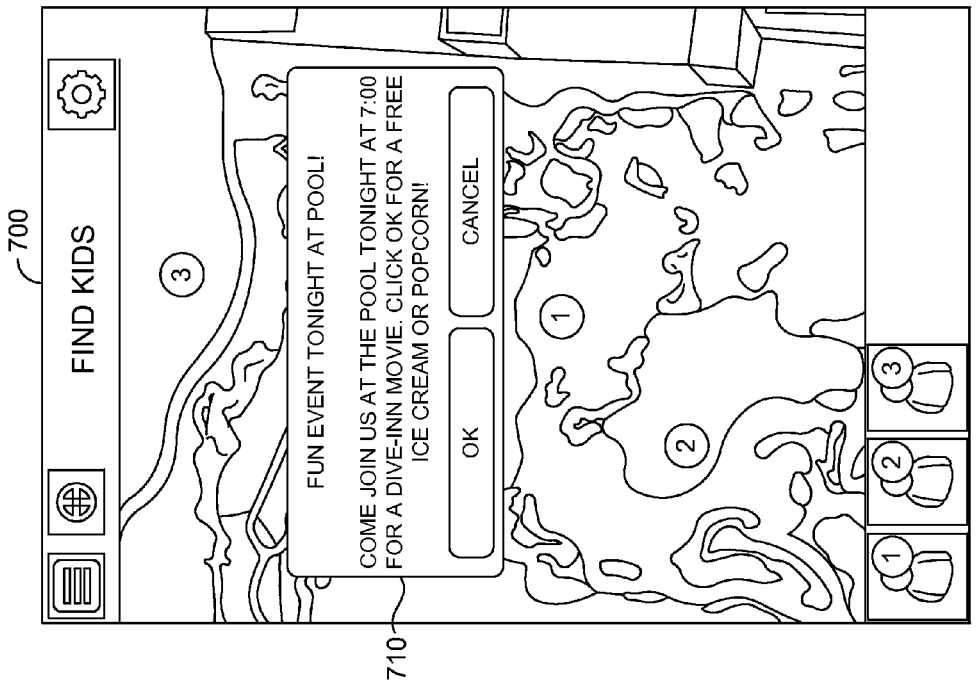

Turning now to FIG. 7, an illustrative graphical user interface for receiving incentives via the mobile application is shown. An incentives display area 700 displays incentives 710 based on information received by the location. The incentives may prompt the user to visit a particular location within the location. The incentives may also prompt the user to return to the location. The incentives may activate a QR reader enabling the user to scan a QR code provided by the particular location.

In FIG. 8, an illustrative graphical user interface is shown for utilizing the mobile application. In particular, an options display area 800 displays options to the user. A boundaries option 810 enables the user to set up safe boundaries for each person at the location. A breadcrumb option 820 enables the user to view a breadcrumb log that provides a historical view on the map for the location indicating where and when each person has visited. The breadcrumb log may also list timestamps and locations associated with each person in a log format. A QR option 830 enables the user to utilize a QR scanner to scan QR codes associated with incentives provided by the location as described herein. A map option 840 enables the user to view the map associated with the location.

With reference now to FIG. 9, an illustrative graphical user interface is shown for configuring settings within the mobile application. A settings display area 900 displays settings available to the user. A boundaries setting 910 enables the user to turn on or turn off the boundaries option. A breadcrumb setting 920 enables the user to turn on or turn off the breadcrumb option. A coupon setting 930 enables the user to turn on or turn off the ability to receive incentives from the location. A checkout setting 940 enables the user to log out of the application and clear all tracking information for all persons from the mobile application, the web application, and the tracking engine.

Figure 10:
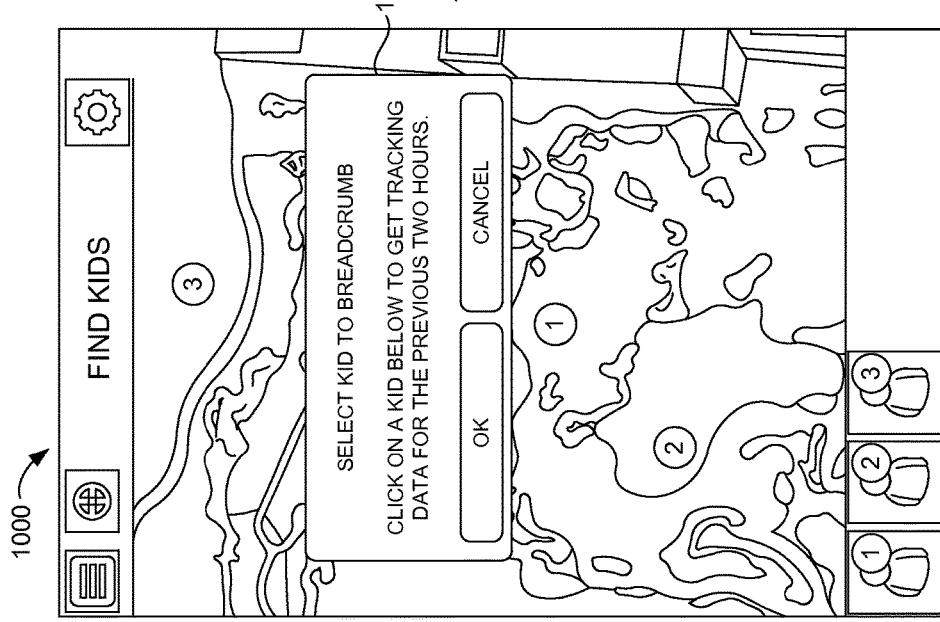

Turning now to FIG. 10, an illustrative graphical user interface for receiving tracking data via the mobile application is shown. A set up display area 1000 displays set up information for viewing tracking data for one or more persons. A message 1010 guides the user to set up breadcrumbs. The user may select the image 1020 associated with one or more persons to view the respective tracking data.

Figure 11:
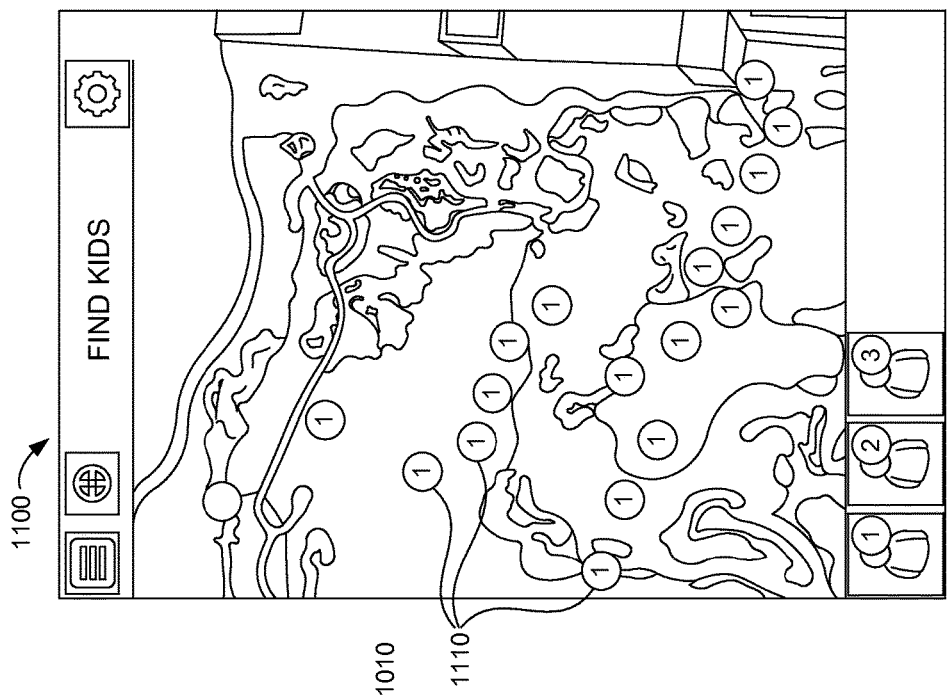

In FIG. 11, an illustrative graphical user interface is shown to depict the tracking data associated with the breadcrumb. In particular, a breadcrumb display area 1110 displays the historical tracking data 1110 for one or more persons. The historical tracking data 1110 indicates a person location within the location for a configurable or predetermined time period.

Figure 12:
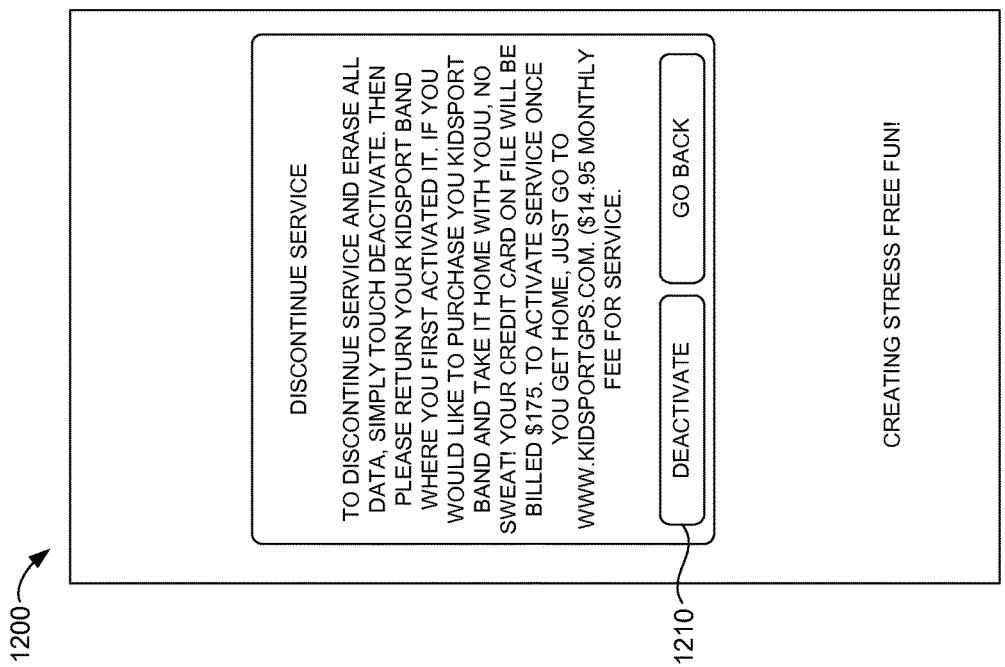

With reference now to FIG. 12, an illustrative graphical user interface is shown for discontinuing service via the mobile application. A discontinue display area 1200 guides the user through discontinuing service and provides additional instructions to the user for returning the tracking devices. A deactivate button 1210 enables the user to deactivate the tracking devices and clear all tracking information for all persons from the mobile application, the web application, and the tracking engine. Deactivating the tracking device may disassociate the IMEI number from the mobile application and/or mobile device associated with the user. In one embodiment, the tracking device is automatically deactivated at check-out or an expected check-out date.

Figure 13:
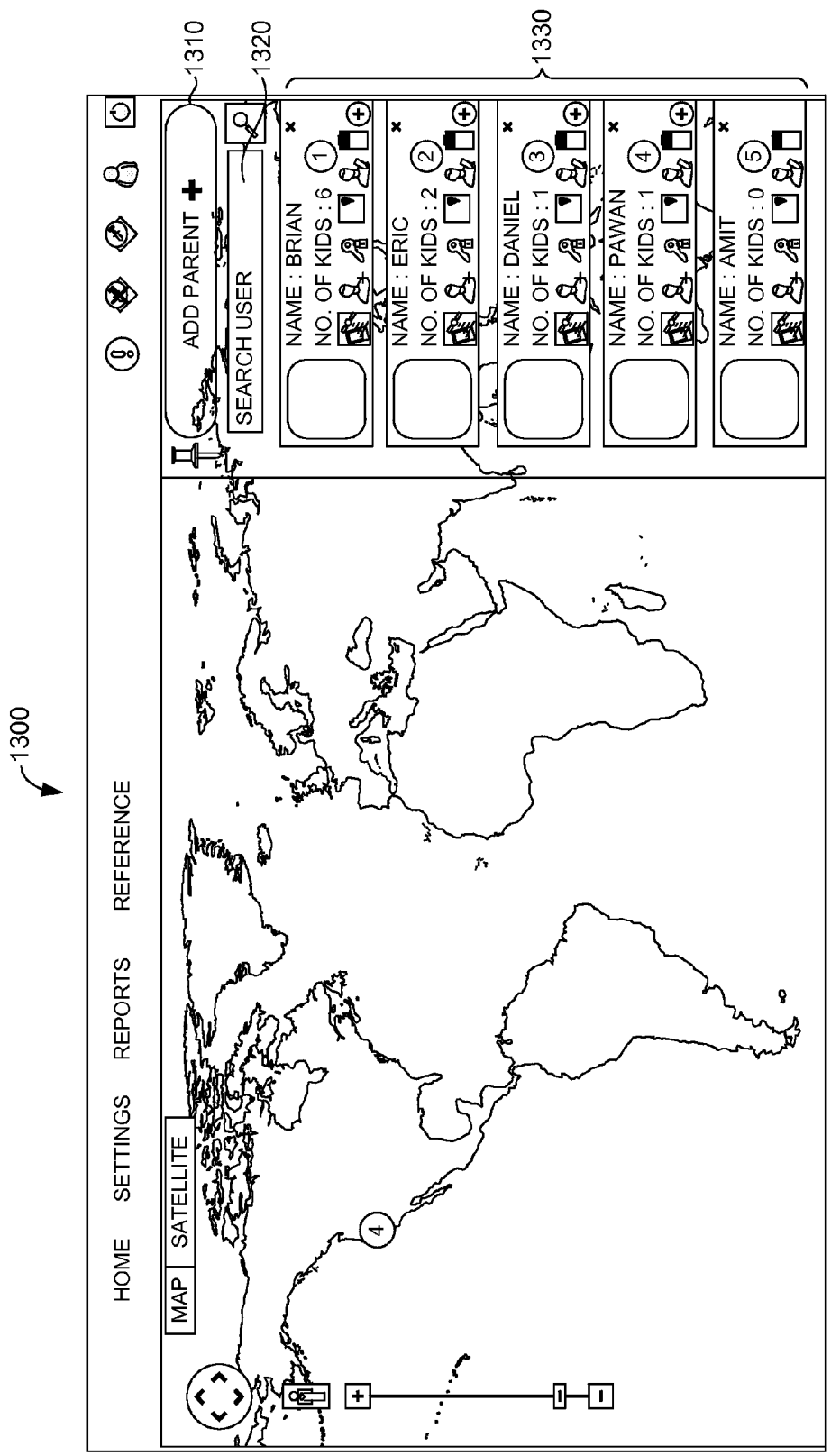
FIGS. 13-16 depict illustrative screen displays, in accordance with embodiments of the present invention.

Turning now to FIG. 13, an illustrative graphical user interface for adding users and one or more persons via a web application is shown. An add users display area 1300 displays a map associated with a location and tools for adding parents and users to the web application associated with the location. An add button 1310 enables the location to add the user to the web application associated with the location. If the user has already been associated with the location, a search button 1320 enables a search to be performed for the user and information associated with the user to be retrieved. One or more active users 1330 associated the location are provided. Information associated with the one or more active users may include a name, a number of persons associated with the user, tracking information, key information, battery life of associated tracking devices, and the like. Similarly, the location may add or configure any of this or additional information associated with the user.

Figure 14:
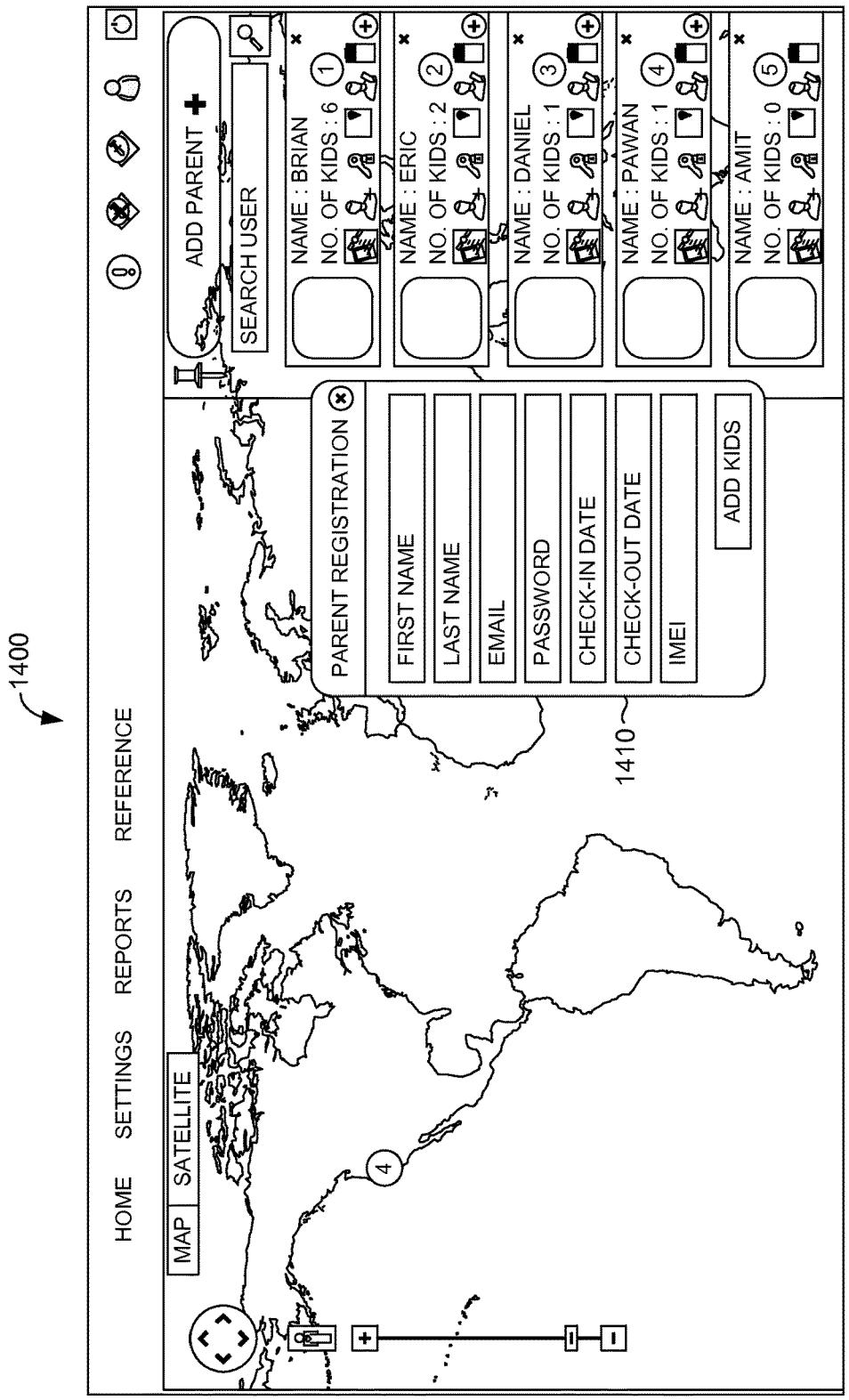

In FIG. 14, an illustrative graphical user interface is shown to depict registering a user at a location via the web application. In particular, a registration display area 500 displays a user registration form 1410 for the location. The user registration form 1410 is configured to receive user information, including name, email address, password, check-in date, and check-out date. The user registration form 1410 may also include an IMEI code associated with one or more tracking devices.

Figure 15:
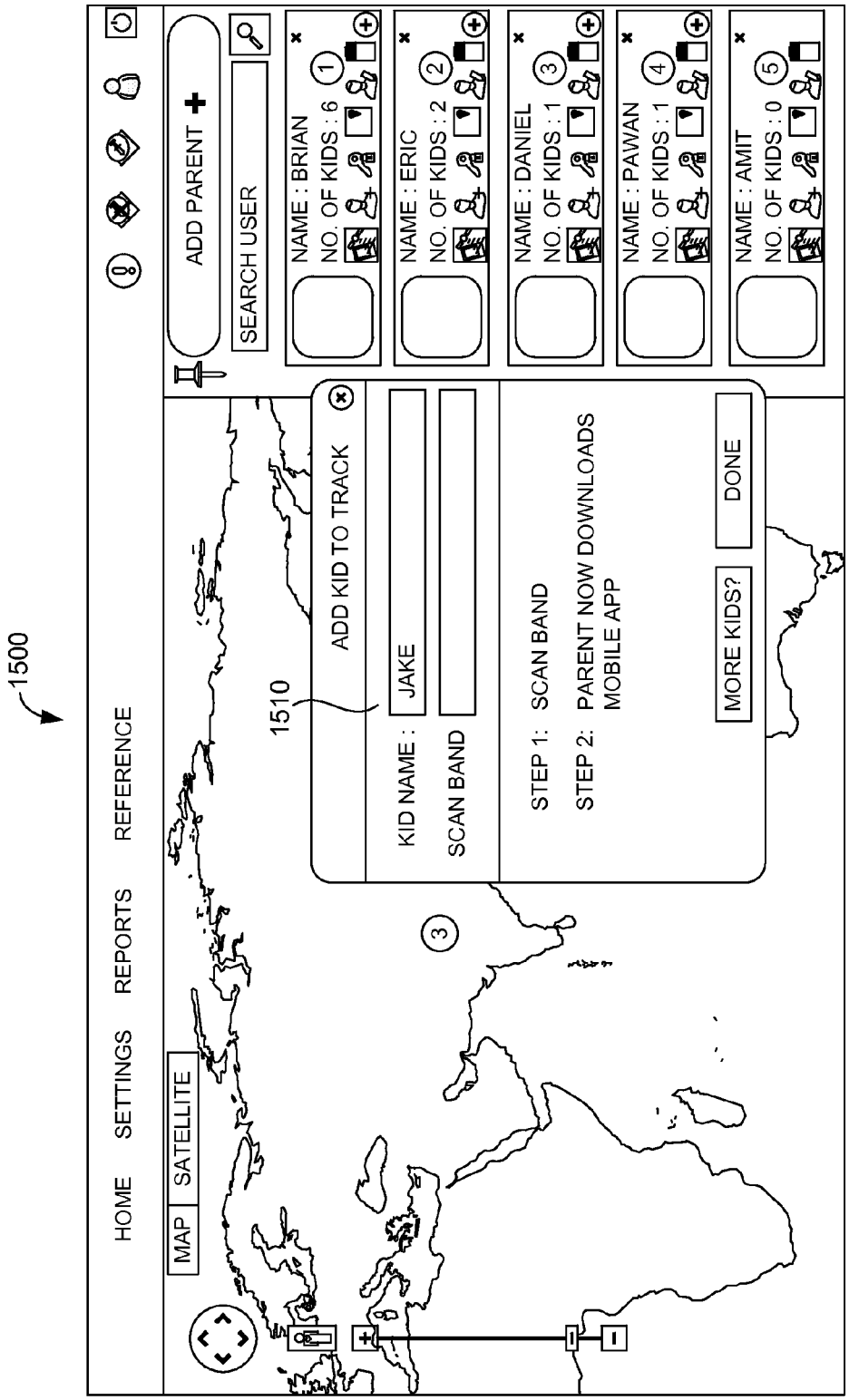

With reference now to FIG. 15, an illustrative graphical user interface is shown for adding one or more persons for tracking via the web application. A tracking setup display area 1500 includes a person tracking form 1510. The person tracking form 1510 is configured to receive a name of the person and the IMEI code associated with the tracking device. The person tracking form 1510 may guide the location to scan the tracking device to receive the IMEI code into the person tracking form 1510.

Figure 16:
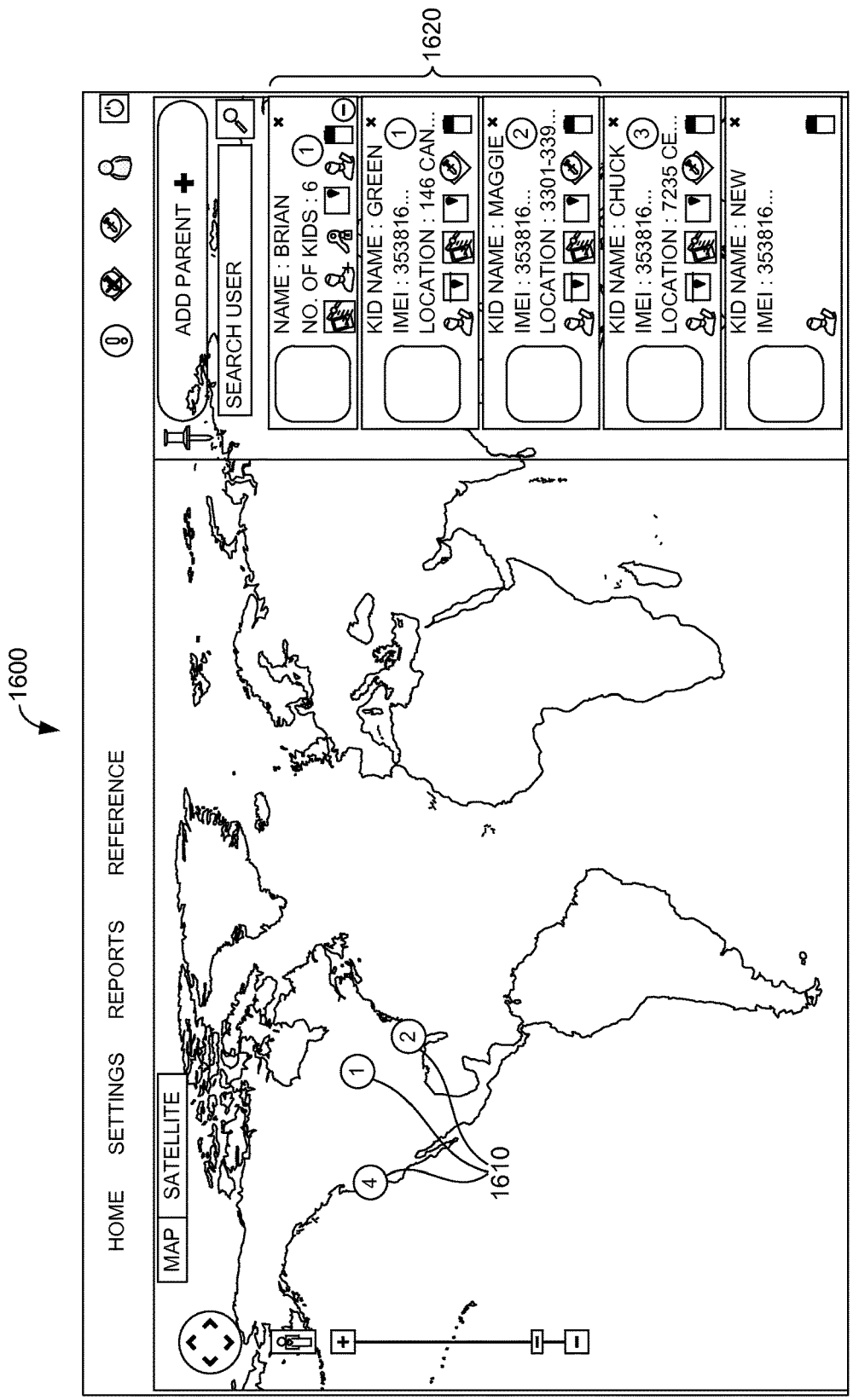

Turning now to FIG. 16, an illustrative graphical user interface for providing tracking information via the web interface is shown. A web tracking display area 1600 displays a map associated with the location. A location on the map 1610 associated with one or more users 1620 is provided.

Figure 17:
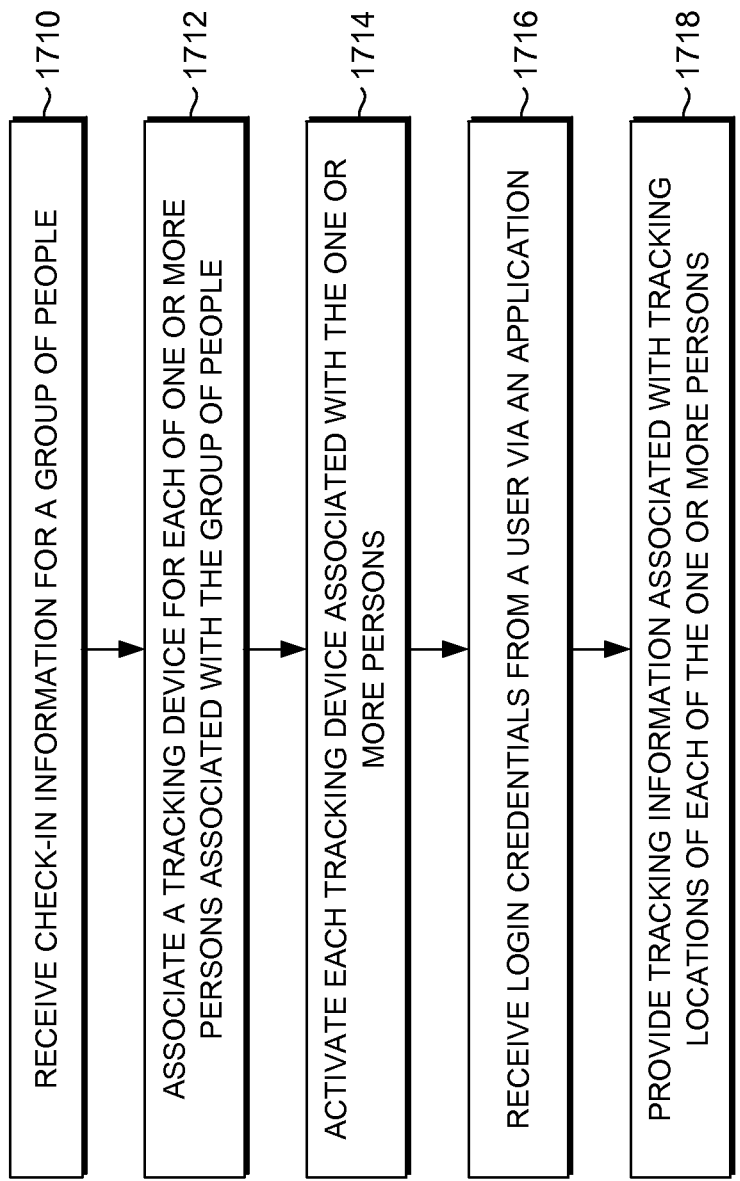
FIG. 17 is a flow diagram showing an exemplary method of vacation tracking and marketing, in accordance with an embodiment of the present invention.

Referring now to FIG. 17, a flow diagram is illustrated showing an exemplary method 1700 of tracking and providing marketing analytics. As indicated at step 1710, check-in information is received for a group of people (e.g., utilizing the check-in component 232 of the tracking engine 230 of FIG. 2). The check-in information may be associated with a location. In one embodiment, the check-in information may be based on location information for the group of people. In one embodiment, the location is a resort, camp, school, group, facility, theme park, stadium, tourist attraction, or shopping mall.

A tracking device is associated, at step 1712, for each of one or more persons associated with the group of people. In one embodiment, the tracking device is provided by each of the one or more persons. In one embodiment, the tracking device is provided by the location. An identifier may be received for each tracking device associated with the one or more persons. The identifier may include an IMEI code. At step 1714, each tracking device associated with the one or more persons is activated. In one embodiment, activating the tracking device enables a system associated with the location (e.g., the tracking engine 230 of FIG. 2) to register or log information associated with each tracking device. The information may include tracking data, traffic data, sales data, location data, and the like.

At step 1716, login credentials are received from a user via an application. The login credentials may indicate a user has launched an application associated with the location on a mobile device associated with the user. The user may configure the application as described herein to associate photographs with each of the one or more persons, setup boundaries, breadcrumbs, alerts, and the like.

In one embodiment, one or more boundaries are received from the user or the location (e.g., utilizing the boundary component 236 of the tracking engine 230 of FIG. 2). The one or more boundaries may define safe areas associated with the location for each of the one or more persons. The one or more boundaries may be distinct, as set by the user, for each of the one or more persons. Similarly, the one or more boundaries may change, as set by the user, for the person based on a time of day, location of the person relative to other persons, location of the person relative to the user, and the like.

At step 1718, tracking information associated with tracking locations of each of the one or more persons is provided (e.g., utilizing the track component 238 of the tracking engine 230 of FIG. 2). The tracking information may be logged such that historical tracking information (i.e., breadcrumbs) is available to the user or the location. The tracking information may include location and traffic data of a person or a group of people.

In one embodiment, alerts are provided to the user (e.g., utilizing the alert component 240 of the tracking engine 230 of FIG. 2). The alerts may be triggered when a person approaches or crosses a particular boundary. The tracking device may enable initiation of the alerts by each of the one or more persons. In this regard, the person may communicate a particular alert to the user when the person determines an alert is necessary.

In one embodiment, marketing analytics are provided to the location (e.g., utilizing the analytics component 248 of the tracking engine 230 of FIG. 2). The marketing analytics may include location and traffic data for each tracking device and each user device. In one embodiment, incentives are provided to the user (e.g., utilizing the deal/marketing component 242 and/or the loyalty component 250 of the tracking engine 230 of FIG. 2). The incentives may be based on tracking information received by the location. In one embodiment, the incentives include encouragements to the user or the one or more persons to move to other areas within the location. In one embodiment, the incentives include encouragements to the user or the one or more persons to revisit the location or associated locations.

In one embodiment, the tracking device is activated as a key (e.g., a room key) associated with the location (e.g., utilizing the key component 244 of the tracking engine 230 of FIG. 2). This allows the one or more persons to utilize the tracking device as an RFID room key to unlock the room. In one embodiment, the tracking device is enabled to be utilized to make cashless payments (e.g., utilizing the payment component 246 of the tracking engine 230 of FIG. 2). The user may load the tracking device with a desired amount of funds and the one or more persons may make RFID cashless payments with the tracking device. Similarly, the user may associate a credit card, bank account, or room number with the tracking device so the one or more person may make RFID cashless payments with the tracking device that are drawn from the associated credit card or bank account or billed to the appropriate room number or user.

In one embodiment, interactive games are provided to the one or more persons via the tracking device (e.g., utilizing the games component 252 of the tracking engine 230 of FIG. 2). In one embodiment, the interactive games are provided in association with the tracking device and areas within the location (e.g., scavenger hunt games and the like). In one embodiment, the interactive games are provided in association with the tracking device and other tracking devices associated with the location (e.g., hide and seek and the like).

It is contemplated that the group of persons may be tracked at any number of locations. For example, tracking and marketing analytics may be provided at youth camps or school trips (e.g., field trips) where large groups of children are off school property and a leader needs to keep track of them. Similarly, tracking may be utilized by parents wanting to know children are safe at a bus stop or in transit to or from school. In another example, tracking may be utilized by long-term care facilities and the like to provide a safe environment for elderly or Alzheimer's patients.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer readable media storing computer-executable instructions that, when executed by one or more computing devices, cause the one or more computing devices to perform a method for sending alerts based boundary and location data, the method comprising:
via a mobile application installed on a mobile device having a graphical user interface, receiving an indication that a first person of a group of people associated with an attraction location desires to check-in to the attraction location and track at least a second person of the group of people, wherein the mobile device is associated with the first person;
receiving identification information for the second person, the identification information including at least a tracking identifier corresponding to a tracking device that has been associated with the second person, wherein the tracking device includes a band configured to secure the tracking device to a wrist of the second person, and wherein the tracking device is configured to provide a location of the second person;
activating the tracking device as a key that unlocks a door at the attraction location, wherein, by activating the tracking device as a key, the door is unlocked in response to determining that the key is proximate the door based on a radio frequency identification (RFID) associated with the key;
communicating for display on the graphical user interface of the mobile device a map of an area associated with the attraction location;
via the mobile application, receiving from the first person a set of boundaries for the tracking device of the second person, the set of boundaries comprising one or more geographic boundaries for the second person defined by the first person, wherein the first person defines the set of boundaries by superimposing boundary lines on the map displayed on the graphical user interface;
from the tracking device of the second person, receiving location information associated with a location of the second person;
storing the location as historical location information, such that the location information comprises and historical locations of the second person, wherein the historical location information indicates the second person has visited a location within a configurable period of time;
providing the location information associated with a location of the second person to the first person;
based on the location information associated with the location of the second person, determining that the second person crossed a boundary of the set of boundaries;
based on determining that the second person crossed the boundary of the set of boundaries, sending an alert to the first person, the alert including at least the location of the second person as determined by the tracking device associated with the second person; and
receiving an indication that the first person is checking out of the attraction location, and in response to receiving the indication that the first person is checking out of the attraction location, deactivating the tracking device of the second person and deleting the historical location information of the second person.

2. The media of claim 1, wherein the attraction location is associated with a resort, camp, school, group, facility, theme park, stadium, tourist attraction, or shopping mall.

3. The media of claim 2, wherein the identifier associated with the tracking device enables a system associated with the attraction location to log information associated with each tracking device.

4. The media of claim 3, further comprising receiving marketing analytics based on the location information received from the tracking device.

5. The media of claim 1, wherein the set of boundaries defines a safe area associated with the attraction location or an unsafe area associated with the attraction location.

6. The media of claim 1, further comprising providing one or more incentives based on the location information received by the tracking device and on traffic location information received from a plurality of tracking devices, wherein the one or more incentives manage traffic at the attraction location by reducing traffic at a particular area or by increasing traffic at the particular area associated with the attraction location.

7. The media of claim 6, further comprising identifying a staffing surplus or deficiency based on the location information received by the tracking device.

8. The media of claim 6, wherein the one or more incentives include encouragements to move to another area within the attraction location.

9. The media of claim 1, further comprising providing one or more incentives that include encouragements to revisit the attraction location.

10. The media of claim 1, further comprising:
receiving from the first person an authorization that enables the second person to utilize the tracking device to make cashless payments at a specific area associated with the attraction location; and receiving from the first person a request to preload a particular dollar amount for use as the cashless payments.

11. The media of claim 1, further comprising providing interactive games in association with the tracking device and areas within the attraction location.

12. The media of claim 1, wherein the set of boundaries is associated with an age restriction.

13. The media of claim 1, wherein the set of boundaries also comprises one or more geographic boundaries for a third person, the third person associated with another tracking device.

14. The media of claim 1, wherein the set of boundaries defines an area for the second person to stay within.

15. The media of claim 1, wherein the mobile application is associated with the attraction location.

16. The media of claim 13, wherein the one or more geographic boundaries for the second person and the one or more geographic boundaries for the third person are different boundaries.

17. The media of claim 13, wherein the one or more geographic boundaries for the second person are the one or more geographic boundaries for the third person.

18. The media of claim 1, further comprising communicating for display on the graphical user interface of the mobile device the historical location information.

19. A system for sending alerts based on boundary and location data, the system comprising:
  a tracking device that provides a location of the tracking device tracking information, the tracking device comprising a band configured to secure the tracking device to a wrist;
  a tracking engine that:
    receives an indication that a first person of a group of people associated with a an attraction location desires to check-in to the attraction location and track at least a second person of the group of people, wherein the indication is associated with a mobile device associated with the first person, the mobile device having a graphical user interface, and wherein the indication includes identification information for the second person and a tracking identifier corresponding to the tracking device associated with the second person;
    activates the tracking device as a key that unlocks a door at the attraction location, wherein, by activating the tracking device as a key, the door is unlocked in response to determining that the key is proximate the door based on a radio frequency identification (RFID) associated with the key;
    communicates for display on the graphical user interface of the mobile device a map of an area associated with the attraction location;
    from the first person, receives a set of boundaries that includes one or more geographical boundaries, the one or more geographical boundaries defining a prohibited area for the second person, wherein the one or more geographical boundaries is defined by the first person by superimposing boundary lines on the map;
    receives the location of the second person tracking information from the tracking device associated with the second person;
    utilizes the location of the second person to:
      provide an incentive that encourages the second person to move to a different location within the attraction location, and
      identify a staffing surplus or deficiency for the attraction location;
    stores the location of the second person as historical location information;
    communicates for display on the graphical user interface of the mobile device the historical location information;
    based on the location of the second person, determines that the second person is near a boundary of the one or more geographical boundaries or has crossed the boundary of the one or more geographical boundaries;
    based on determining that the second person is near the boundary or has crossed the boundary, sends an alert to the first person, the alert including at least the location of the second person; and
    receives an indication that the first person is checking out of the attraction location, and in response to receiving the indication that the first person is checking out of the attraction location, deactivates the tracking device of the second person and deletes the historical location information of the second person.

20. A computerized method for sending alerts based boundary and location data, the method comprising:
  at one or more processors, receiving an indication that a first person of a group of people associated with an attraction location desires to check-in to the attraction location and track at least a second person of the group of people, wherein the mobile device is associated with the first person and comprises a graphical user interface;
  at the one or more processors, receiving identification information for the second person, the identification information including at least a tracking identifier corresponding to a tracking device that has been associated with the second person, the tracking device configured to provide a location of the second person;
  by the one or more processor, activating the tracking device as a key that unlocks a door at the attraction location, wherein, by activating the tracking device as a key, the door is unlocked in response to determining that the key is proximate the door based on a radio frequency identification (RFID) associated with the key;
  by the one or more processors, communicating for display on the graphical user interface of the mobile device a map of an area associated with the attraction location;
  at the one or more processors, receiving from the first person a set of boundaries for the tracking device of the second person, the set of boundaries comprising one or more geographic boundaries for the second person defined by the first person, wherein the set of boundaries is defined by superimposing boundary lines on the map displayed on the graphical user interface;
  at the one or more processors, receiving from the tracking device of the second person the location of the second person;
  storing the location of the second person as historical location information;
  at the one or more processors, utilizing the location of the second person to:
    provide an incentive that encourages the second person to move to a different location within the attraction location, and
    identify a staffing surplus or deficiency for the attraction location;

at the one or more processors, based on the location of the second person, determining that the second person crossed a boundary of the set of boundaries;

by the one or more processors, based on determining that the second person crossed the boundary of the set of boundaries, sending an alert to the first person, the alert including at least the location of the second person; and receiving an indication that the first person is checking out of the attraction location, and in response to receiving the indication that the first person is checking out of the attraction location, deactivating the tracking device of the second person and deleting the historical location information of the second person.

\* \* \* \* \*